United States Patent [19]
Pearce et al.

[11] Patent Number: 6,012,828
[45] Date of Patent: Jan. 11, 2000

[54] DEVICE FOR ATTACHING A LIGHT TO A TRAILER HITCH FRAME

[76] Inventors: George A. Pearce, 2487 Lennox Dr., Germantown, Tenn. 38138; Sam Fu; Calvin S. Wang, both of 14317 E. Don Julian Rd., Industry, Calif. 91746

[21] Appl. No.: 08/986,349

[22] Filed: Dec. 8, 1997

[51] Int. Cl.[7] ........................................... B60Q 1/12
[52] U.S. Cl. ................ 362/506; 362/505; 362/540; 362/541; 362/549; 362/485
[58] Field of Search ................................... 362/493, 505, 362/506, 540, 541, 549, 485, 486, 507, 432; D26/138

[56] References Cited

U.S. PATENT DOCUMENTS

| | | | |
|---|---|---|---|
| 3,861,632 | 1/1975 | Siilats | 248/223 |
| 4,800,471 | 1/1989 | Lippert | 362/80 |
| 5,157,591 | 10/1992 | Chudzik | 362/80 |
| 5,258,898 | 11/1993 | Thornton | 362/394 |
| 5,727,865 | 3/1998 | Caldwell | 362/80 |
| 5,788,363 | 8/1998 | Kamaya et al. | 362/285 |

*Primary Examiner*—Vip Patel
*Assistant Examiner*—Michael J. Smith
*Attorney, Agent, or Firm*—Albert O. Cota

[57] ABSTRACT

A device (10) for attaching a light to a trailer hitch frame (172). The device (10) is comprised of a lamp assembly (12) that attaches to an adjustable lamp attachment assembly (40) which allows the lamp assembly (12) to be adjusted radially and in elevation. The lamp assembly (12) is attached to a trailer hitch frame attachment bracket (64) that is dimensioned to fit over a trailer hitch frame (172) that can range in size from 1.25 square inches to 4.0 square inches (3.2 to 10.2 cm). The frame attachment bracket (64) is attached to the trailer hitch frame (172) by means of two nylon tie wraps (136,144). The tie wraps, which are secured to the bracket (64), are wrapped around the trailer hitch frame (172) and are locked in place. After the bracket (64) is secured to the trailer hitch frame (172), the device (10) is connected to the vehicle electrical circuit that controls the vehicle rear lights.

10 Claims, 3 Drawing Sheets

DEVICE FOR ATTACHING A LIGHT TO A TRAILER HITCH FRAME

TECHNICAL FIELD

The invention pertains to the general field of vehicle rear lights and more particularly to a device which allows a light to be attached to a trailer hitch frame by means of tie wraps.

BACKGROUND ART

Ever since cars and trucks have been available, owners have installed after-market accessories in order to customize their vehicles. Some after-market accessories merely add visual enhancement without serving a real purpose. Other accessories, though, are designed and built to either add to a vehicle's original utility or to alter a vehicle for a special purpose.

Regardless of the reason for customizing or the application of accessories, there are some after-market products that are employed by a large percent of people. One of these products is the add-on or emergency light, which includes additional lights mounted on the bumper, a roll-bar, the roof of a truck or particularly to a trailer hitch frame. These add-on lights are extremely useful in that they can be used as a warning or distress signal, or they can add illumination to dark places. A popular and widely used type of add-on lights are used at a vehicle's rear. These lights come in many shapes sizes and they may be colored or clear.

Add-on lights are also, in addition to providing illumination, a legal requirement in many counties when a person is towing a trailer. Trailers hitch frames come in a variety of styles and can be found in numerous different sizes. Often people find it necessary to "rig" the lights onto the trailer hitch frame. Rigging includes anything from drilling and tapping for a screw to using tape or even wire to secure the lights in position. Whereas some of the methods are extremely unreliable and even dangerous. They are presently the only means by which to secure the lights to the trailer hitch frame.

Obviously, if there was some type of add-on light that could be safety and securely attached to a trailer hitch frame or a bumper, it would solve many of the problems currently experienced by people attempting to attach add-on lights.

A search of automotive magazines, catalogs, and automotive displays did not disclose any vehicle rear-attached lamp assemblies that read on the claims of the instant invention.

DISCLOSURE OF THE INVENTION

The invention disclosed herein is specifically designed to provide a quick, easy and secure device and method for attaching an implement, such as a light, to a trailer hitch frame located on a vehicle such as a truck. The device is comprised of: a lamp assembly, a trailer-hitch frame attachment bracket, a means for attaching one side of the trailer hitch frame attachment bracket to the lamp assembly and a means for attaching the trailer hitch attachment bracket to the trailer hitch frame.

The lamp assembly consists of a light having attached a housing that includes an upper surface, a lower surface and a rear surface. To the rear surface of the housing is attached an electrical junction cup from where extends outward a positive electrical lead and a negative electrical lead.

The trailer-hitch frame attachment bracket includes a vertical section and a horizontal section. The vertical section has an upper edge, a lower edge, a first side edge and a second side edge. Near the lower edge and the first side edge is located a first upset hat and near the lower edge and the second side edge is located a second upset hat. The horizontal section integrally extends outward from the upper edge of the vertical section. The horizontal section terminates with an outer edge and has a first side edge and a second side edge. Near the outer edge and the first side edge is located a third upset hat and near the outer edge and the second side edge is located a fourth upset hat.

The means for attaching the horizontal section of the trailer-hitch frame attachment bracket to the housing of the lamp assembly is disclosed in two designs: in the first design a horizontally oriented U-shaped section having sides and an elongated section is used. The sides are attached to the sides of the housing and the elongated section is attached, by an attachment means, to the vertical section of the bracket. In the second design a more complex but versatile design is employed that includes an adjustable lamp attachment assembly that includes a U-shaped member and an angled bracket that is adjustable attached to a U-shaped member rigidly attached to the lamp assembly. The details of the first and second design are described in the BEST MODE FOR CARRYING OUT THE INVENTION section.

The final element of the device is the means for attaching the trailer-hitch frame attachment bracket to the trailer hitch frame. This means consists of a first tie wrap and a second tie wrap wherein each tie wrap has a first end and a second end. The second ends terminate with a tie insert, that may consist of a permanent-lock tie insert or a releasable tie wrap insert. The first tie wrap is inserted through the first and third hats and the second tie wrap is inserted through the second and fourth hats.

The trailer hitch frame attachment bracket is dimensioned to be positioned on a trailer hitch frame with the horizontal section of the bracket positioned on either an upper or lower surface of the trailer hitch frame and the vertical section pressed against a front surface of the trailer hitch frame. After the above positioning, the first and second tie wraps are wrapped around the trailer hitch frame and the first ends of the tie wraps are inserted into the respective tie inserts and pulled tight to secure the device to the trailer hitch frame.

After the device is secured to the trailer hitch frame, the positive electrical lead is connected to the positive terminal of a vehicle back light and the negative lead is connected to a vehicle body ground. When so attached, the lights can be operated by the vehicle light switch.

In view of the above disclosure it is the primary object of the invention to provide an adjustable rear light assembly that can be easily attached to a trailer hitch frame by means of tie wraps.

In addition to the primary object of the invention it is also an object of the invention to provide a device for attaching a light to a trailer hitch frame that:

adds a safety factor to a vehicle, can be attached to other vehicle structures such as a bumper, and is cost effective from both a consumer and manufacturing points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment which allows a lamp assembly to be adjustably attached to a trailer hitch frame by utilizing a pair of tie wraps.

Figure 1:
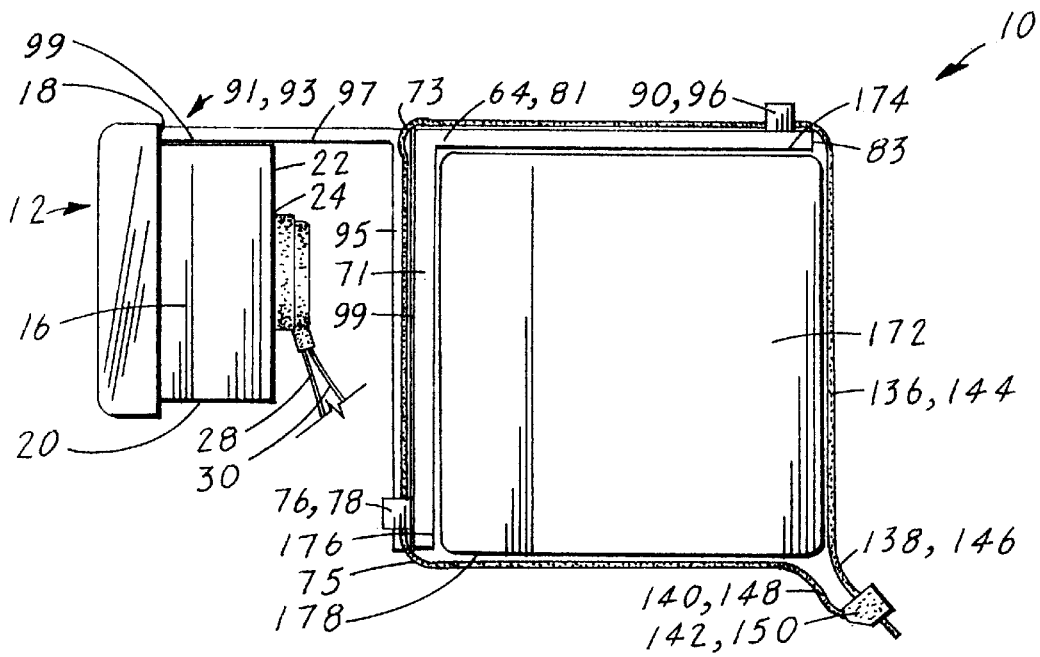
FIG. 1 is a right side elevational view of a simplified device for attaching a light to a trailer hitch frame.
Figure 2:
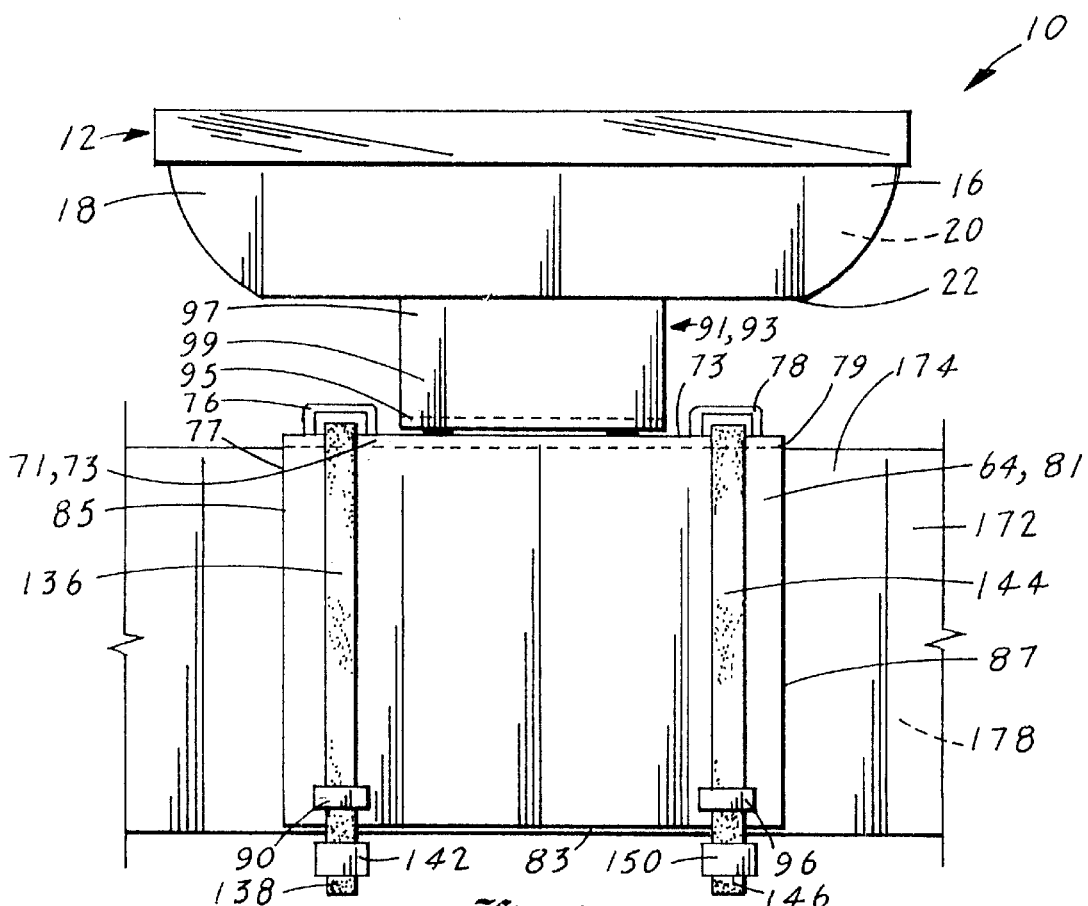
FIG. 2 is an upper plan view of the simplified FIG. 1 device.

The preferred embodiment of the device 10, is disclosed in two design configurations. In the first and simplest design, as shown in FIGS. 1 and 2, the device 10 is comprised of five major elements: a lamp assembly 12, a trailer-hitch frame attachment bracket 64, an angled bracket 93, a first tie wrap 136 and a second tie wrap 144.

The lamp assembly 12 has an attached housing 16 that includes an upper surface 18, a lower surface 20 and a rear surface 22. Attached to the housing 16 is an electrical junction cup 24 from where extends a positive electrical lead 28 and a negative electrical lead 30.

The trailer-hitch frame attachment bracket 64 is comprised of a vertical section 71 and a horizontal section 81. The vertical section 71 includes an upper edge 73, a lower edge 75, a first side edge 77 and a second side edge 79. Near the lower edge 75 and the first side edge 77 is located a first upset hat 76 and near the lower edge 75 and the second side edge 79 is located a second upset hat 78. The horizontal section 81 integrally extends outward from the upper edge 73 of the vertical section 71 and terminates with an outer edge 83. The horizontal section 81 further has a first side edge 85 and a second side edge 87. Near the outer edge 83 and the first side edge 85 is located a third upset hat 90 and near the outer edge 83 and the second side edge 87 is located a fourth upset hat 96.

The trailer-hitch frame attachment bracket 64 is attached to the housing 16 of the lamp assembly 12 by an attachment means. This means, as shown in FIGS. 1 and 2, preferably consists of an angled bracket 93 having a vertical section 95 and a horizontal section 97. The horizontal section 97 is attached, by an attachment means 99, to the upper surface 18 of the lamp assembly housing 16. Likewise, the vertical section 95 is attached, by an attachment means 99, to the vertical section 71 of the trailer-hitch frame attachment bracket 64. The attachment means 99 may consists of an adhesive, a spot weld, metal screws or a bolt and nut combination.

The trailer-hitch attachment bracket 64 is attached to the trailer hitch frame 172 by a means that includes a first tie wrap 136 and a second tie wrap 144 as also shown in FIGS. 1 and 2. The first tie wrap 136 has a first end 138 and a second end 140 that terminates with a tie insert 142. The second tie-wrap 140 also has a first end 146 and a second end 14 that terminates with a tie insert 150.

To utilize the device 10, the horizontal section 81 of the trailer-hitch frame attachment bracket 64 is positioned on either an upper surface 174 or a lower surface 178 of the trailer hitch frame 172. Likewise, the vertical section 71 is pressed against a front surface 172 of the trailer hitch frame 172. The first and second tie wraps 136,144 are then wrapped around the trailer hitch frame 172, as shown in FIGS. 1 and 2, and the first ends 138,146 are inserted into the respective tie inserts 142,150 and pulled tight to secure the device 10 to the trailer hitch frame 172.

Figure 8:
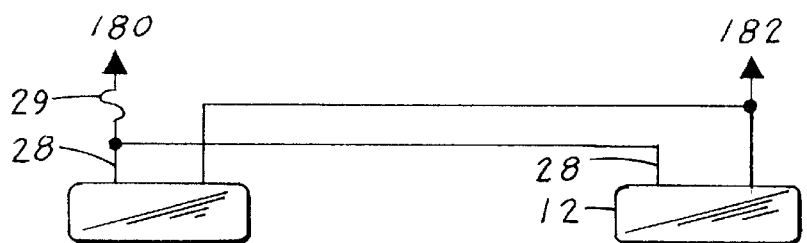
FIG. 8 is a wiring diagram of the device showing the positive electrical leads from a pair of lights attached to the positive terminal of a vehicle back light and the negative electrical leads attached to a vehicle body ground.

After the device 10 is secured, the positive electrical lead 28 is connected to the positive terminal of a vehicle back light and the negative lead 30 is connected to a vehicle body ground as shown in FIG. 8.

The second design, which is shown in FIGS. 3–8, is comprised of the following major elements: a lamp assembly 12, an adjustable lamp attachment assembly 40, an angled bracket 52, a trailer hitch-frame attachment bracket 64, a first tie-wrap 136 and a second tie-wrap 144. The device 10 can be used on a trailer hitch frame 172 that ranges in size from 1.25 square inches to 4.0 square inches (3.2 to 10.2 cm).

Figure 3:
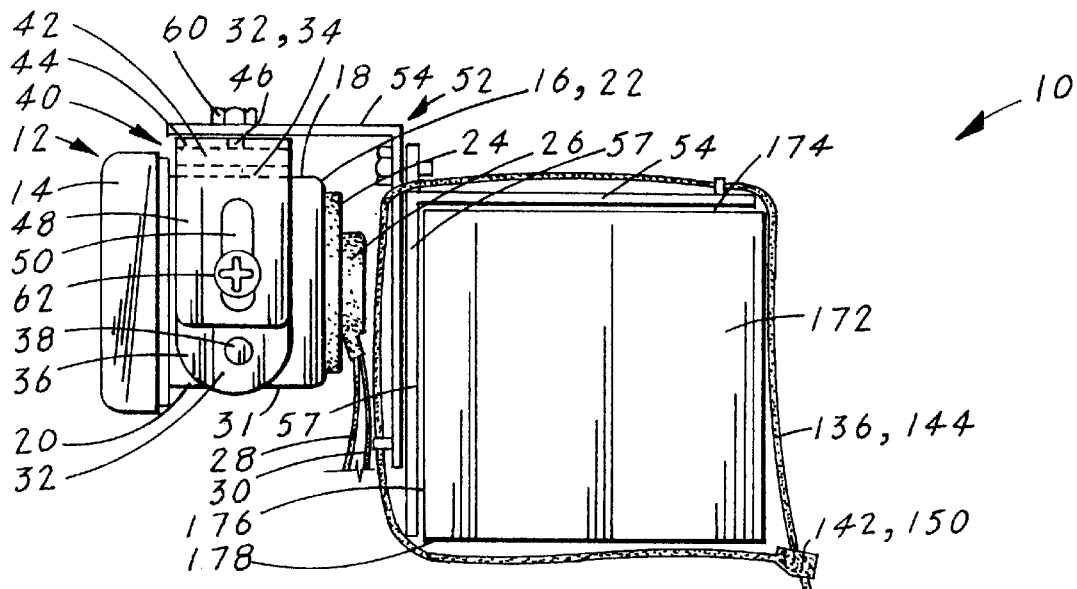
FIG. 3 is a right side elevational view of a device for attaching a light to a trailer hitch frame.
Figure 4:
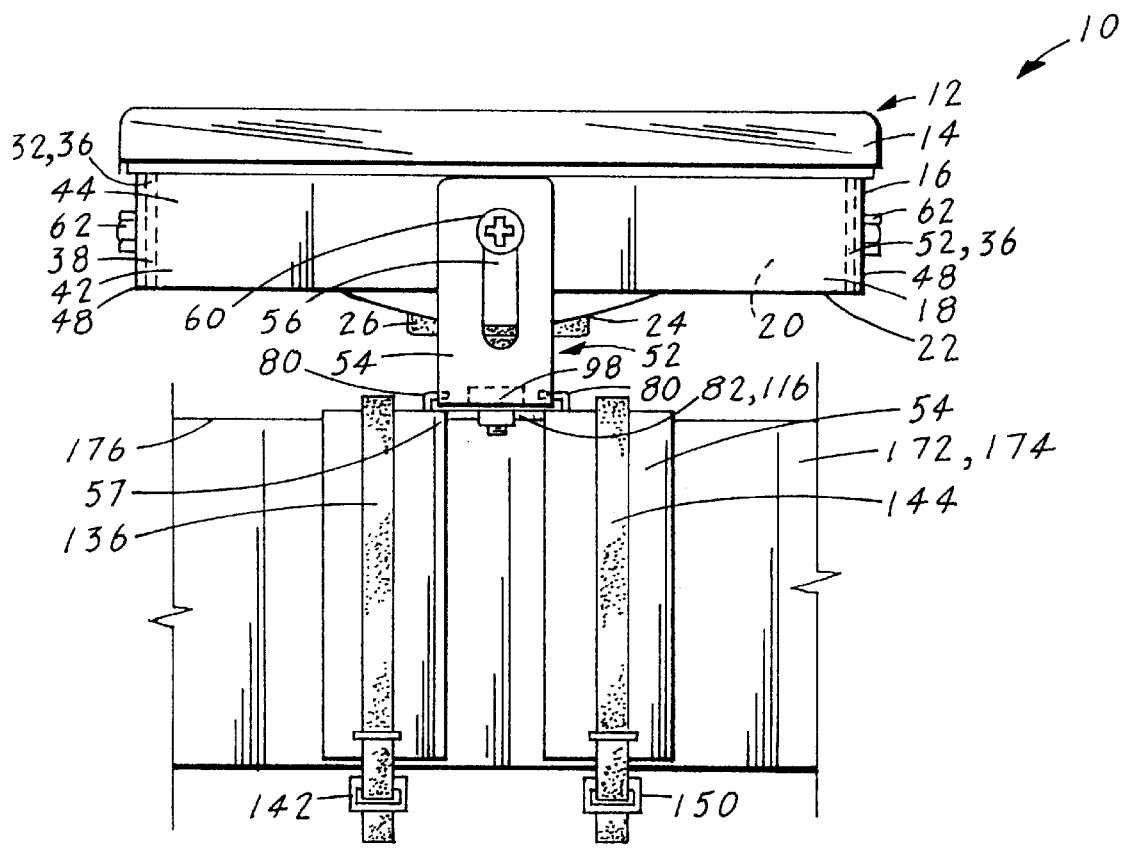
FIG. 4 is an upper plan view of the device.

The lamp assembly 12 as shown in FIGS. 3 and 4 is comprised of a light 14 which typically consists of a 55 watt halogen bulb that produces a wide beam. To the rear of the light 14 is attached a housing 16 which includes an upper surface 18, a lower surface 20 and a rear surface 22. At the rear surface 22 of the housing 16 is centrally attached an electrical junction cup 24. Preferably, over the cup 24 is placed a weather resistant boot 26 that covers and protects the electrical junction and the electrical leads 28,30 from moisture and abrasion. On the lower surface of the housing is located a moisture exit bore 31, as shown in FIG. 3, that allows any accumulation of moisture within the housing 16 to exit through the bore.

The lamp assembly housing 16 also includes a U-shaped member 32 having a horizontal section 34 and two vertical sections 36 as shown in FIGS. 3 and 4. The horizontal section 34 is rigidly attached to either the upper surface 18 as shown in FIG. 3 or to the lower surface (not shown) of the housing 16. The vertical sections 36 each have at least one threaded bore 38.

In the preferred embodiment the means for attaching the lamp assembly 12 to a trailer hitch frame 172 includes the use of an adjustable lamp attachment assembly 40. The assembly 40 includes a U-shaped member 42 and an angled bracket 52. The U-shaped member as shown in FIGS. 3 and 4, has a horizontal section 44 and two vertical sections 48. The horizontal section 44 has a substantially centered bore 46 therethrough and the vertical sections 48 each have a longitudinal slot 50 therethrough as shown in FIG. 3.

Figure 5:
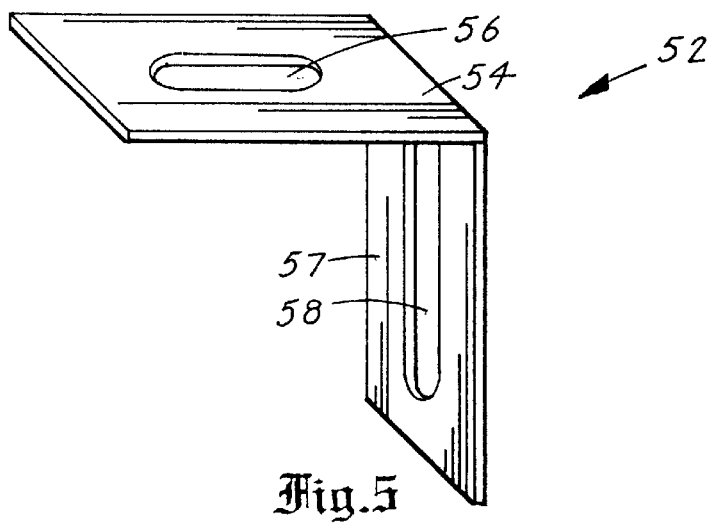
FIG. 5 is a perspective view of an angled bracket which is a component of an adjustable lamp attachment assembly.

The angled bracket 52, as shown in FIGS. 3, 4, and 5, has a horizontal section 54 and a vertical section 57. The horizontal section 54, as shown best in FIG. 5, has a first longitudinal slot 56 therethrough and the vertical section 57 has a second longitudinal slot 58 therethrough. The first longitudinal slot 56 is designed to be adjustably attached to the horizontal section 44 of the U-shaped member 42 by means of a bolt and nut combination 60. As shown in FIGS. 3 and 4, the bolt is inserted into the centered bore 46 and the first longitudinal slot 56.

The adjustable lamp attachment assembly 40 is designed to allow the lamp assembly 12 to be adjusted radially and in elevation. The assembly 40 is adjustably attached to the lamp assembly 12 by inserting a threaded bolt 62 into each of the longitudinal slots 50 and threaded into the corresponding threaded bores 38 located on the vertical sections 36 of the U-shaped member 32.

Figures 6, 7:
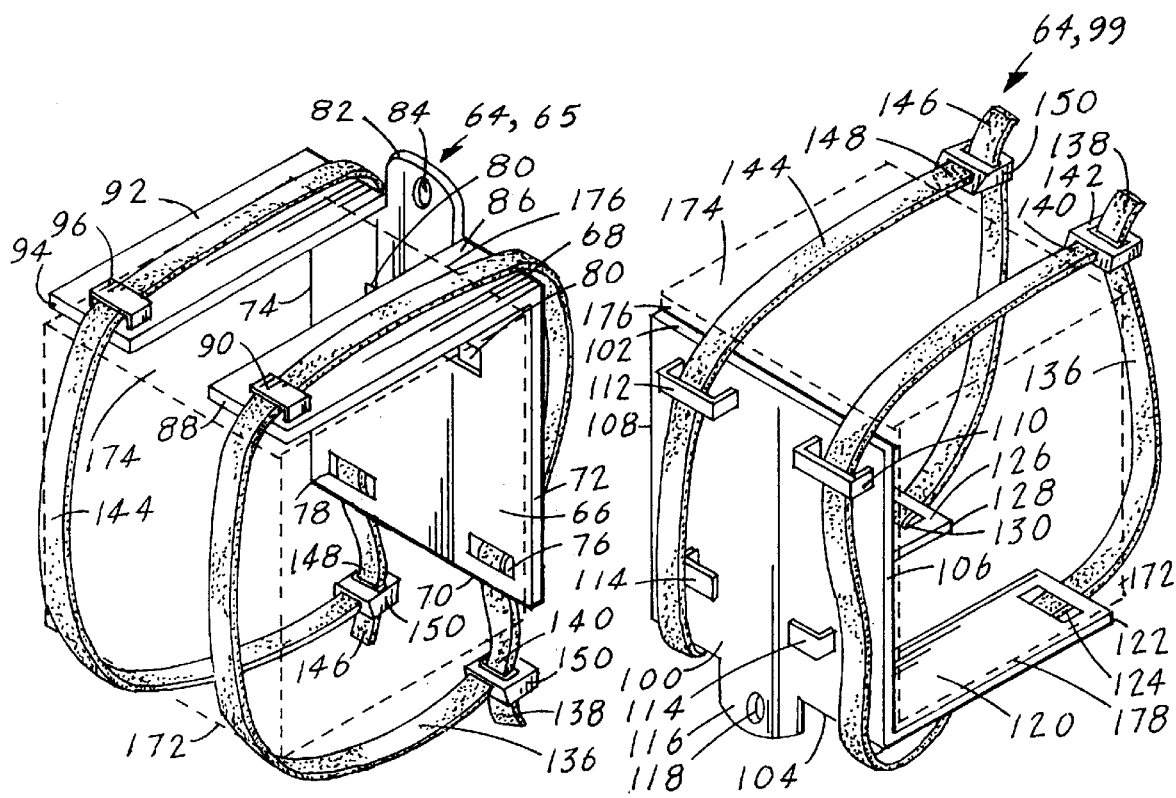
FIG. 6 is a perspective view of a trailer-hitch frame attachment bracket having a pair of horizontal sections that are positioned on the upper surface of the trailer hitch frame.
FIG. 7 is a perspective view of a trailer-hitch frame attachment bracket having a pair of horizontal sections that are positioned on the lower surface of the trailer hitch frame.

The trailer-hitch frame attachment bracket 64 can be positioned in either a first position 65 or in a second position 99. When the bracket 64 is in the first position 65, as shown in FIG. 6, it is comprised of a vertical section 66, a first horizontal section 86 and a second horizontal section 92. The vertical section 66 has an upper edge 68, a lower edge 70, a first side edge 72 and a second side edge 74. Near the lower edge 70 and the first side edge 72 is located a first upset hat 76 and near the lower edge 70 and the second side edge 74 is located a second upset hat 78. Near the upper edge 68 is located a pair of horizontal, inward facing tabs 80 that are spaced to slidably receive the vertical section 57 of the angled bracket 52 as shown in FIG. 4. The vertical section 66 further includes a substantially centered tab 82 that extends upward from the upper edge 68 and that has a threaded bore 84 therethrough.

The first horizontal section 86 integrally extends outward from the upper edge 68 of the vertical section 66 and terminates with an outer edge 88. Near this outer edge 88 is located a third upset hat 90 that is in alignment with the first upset hat 76.

The second horizontal section 92 also integrally extends outward form the upper edge 68 of the vertical section 66 and terminates with an outer edge 94. Near this outer edge 94 is located a fourth upset hat 96 tat is in alignment with the second upset hat 78.

When the trailer hitch frame attachment bracket 64 is in the second position, the bracket 64 is also comprised of a vertical section 100, a first horizontal section 120 and a second horizontal section 126. The vertical section 100 has an upper edge 102, a lower edge 104, a first side edge 106 and a second side edge 108. Near the upper edge 102 and the first side edge 106 is located a first upset hat 110 and near the upper edge 102 and the second side edge 108 is located a second upset hat 112. Near the lower edge 104 is located a pair of horizontal, inward facing tabs 114 that are spaced to slidably receive the vertical section 57 of the angled bracket 52 as shown in FIG. 4. The vertical section 100 further includes a substantially centered tab 116 that extends downward from the lower edge 104 and includes a threaded bore 118 therethrough.

The first horizontal section 120 integrally extends outward from the lower edge 104 of the vertical section 100 and terminates with an outer edge 122. Near this outer edge 122 is located a third upset hat 124 that is in alignment with the first upset hat 110.

The second horizontal section 126 integrally extends outward from the lower edge 104 of the vertical section 100 and terminates with an outer edge 128. Near this outer edge 128 is located a fourth upset hat 130 that is in alignment with the second upset hat 112.

The trailer hitch frame attachment bracket 64 is adjustably attached to the adjustable lamp attachment assembly 40, in either the first position 65 or second positions 99, by inserting the vertical section 57 of the angled bracket 52 into the horizontal inward facing tabs 80 or 114. A threaded bolt 98 is then inserted into the second longitudinal slot 58 and the threaded bore 84 or 118 on the centered tab 82 or 116 located respectively on the angled bracket 52 and the trailer hitch frame attachment bracket 64.

The final inventive element of the invention is the trailer hitch attachment means which is comprised of the first tie wrap 136 and the second tie wrap 144. The two tie wraps are preferably made of nylon which is resistant to the elements and is relatively strong.

The first tie wrap 136, as best shown in FIGS. 6 and 7, has a first end 138 and a second end 140 that terminates with a tie insert 150. The second tie wrap 144, as also best shown in FIGS. 6 and 7, has a first end 146 and a second end 148 that terminates with a tie insert 150.

When the first position 65 of the trailer hitch frame attachment bracket 64 is employed as shown in FIG. 6, the assembled device 10 is positioned on a trailer hitch frame 172 with the first horizontal section 86 and second horizontal section 92 of the trailer-hitch frame attachment bracket 64 resting on an upper surface 174 of the trailer hitch frame 172 and the vertical section 66 of the trailer hitch frame attachment bracket 64 pressed against a front surface 176 of the trailer hitch frame 172.

The first tie wrap 136 and the second tie wrap 144 are then wrapped around the trailer hitch frame 172 with the first end 138 of the first tie wrap 136 inserted sequentially into the first upset hat 76, the third upset hat 90 and into the tie insert 150. Likewise, the first end 146 of the second tie wrap 144 is sequentially inserted into the second upset hat 78, the fourth upset hat 96 and into the tie insert 150. Both of the tie wraps 136,144 are then pulled tight to secure the device 10 to the trailer hitch frame 172.

When the second position 99 of the trailer-hitch frame attachment bracket 64 is employed as shown in FIG. 7, the assembled device 10 is positioned on a trailer hitch frame 172 with the first horizontal section 120 and the second horizontal section 126, the trailer-hitch frame attachment bracket 64 pressed against a lower surface 178 of the trailer hitch frame 172 and the vertical section 100 of the trailer-hitch frame attachment bracket 64 pressed against a front surface 176 of the trailer hitch frame 172.

The first tie wrap 136 and the second tie wrap 144 are then wrapped around the trailer hitch frame 172 with the first end 138 of the first tie wrap 136 inserted sequentially into the third upset 124, the first upset hat 110 and into the tie insert 150. Likewise, the first end 146 of the second tie wrap 144 is sequentially inserted into the fourth upset hat 130, the second upset hat 112 and into the tie insert 150. Both of the tie wraps 136 and 144 are then pulled tight to secure the device 10 to the trailer hitch frame 172. The tie wrap inserts 136,144 may be comprised of a permanent-lock tie wrap insert or a releasable tie-wrap insert.

After the device 10 is secured to the trailer hitch frame 172 the positive electrical lead 28, as shown in FIG. 8, is connected through a fuse 29 to the positive terminal of a vehicle back light 180; likewise, the negative electrical lead 30 is connected to a vehicle body ground 182.

While the invention has been described in complete detail and pictorially shown in the accompanying drawings it is not to be limited to such details, since many changes and modifications may be made in the invention without departing from the spirit and scope thereof. For example, although the device 10 is particularly designed to be attached by the tie wraps 136,144 to a trailer hitch frame 172, the device can also be attached by means of the tie wraps to a rear bumper or the like. Additionally, in lieu of a lamp assembly, an implement such as a display structure can be utilized. Hence, it is described to cover any and all modifications and forms which may come within the language and scope of the appended claims.

We claim:

1. A device for attaching a light to a trailer hitch frame, said device comprising:

a) a lamp assembly having an attached housing that includes an upper surface, a lower surface and a rear surface, wherein attached to the housing is an electrical junction cup from where extends a positive electrical lead and a negative electrical lead, b) a trailer-hitch frame attachment bracket comprising:
   (1) a vertical section having an upper edge, a lower edge, a first side edge and a second side edge, wherein near the lower edge and the first side edge is located a first upset hat and near the lower edge and the second side edge is located a second upset hat,
   (2) a horizontal section that extends outward from the upper edge of said vertical section and terminating with an outer edge, said horizontal section further having a first side edge and a second side edge, wherein near the outer edge and the first side edge is located a third upset hat and near the outer edge and the second side edge is located a fourth upset hat, c) a means for attaching said trailer hitch frame attachment bracket to said lamp assembly housing comprising an angled bracket having a vertical section and a horizontal section where the horizontal section is attached, by an attachment means, to the upper surface of said lamp assembly housing and the vertical section is attached, by an attachment means, to the vertical section of said trailer-hitch frame attachment bracket, d) means for attaching said trailer hitch attachment bracket to the trailer hitch frame comprising:
   (1) a first tie wrap having a first end and a second end that terminates with a tie insert, wherein the first tie wrap is inserted through the first and third upset hats,
   (2) a second tie wrap having a first end and a second end that terminates with a tie insert, wherein the first end is inserted through the second and fourth upset hats, wherein when said trailer hitch frame attachment bracket is positioned on a trailer hitch frame with the horizontal section positioned on either an upper or lower surface of the trailer hitch frame and with the vertical section pressed against a front surface of the trailer hitch frame, said first and second tie wraps are then wrapped around the trailer hitch frame and the first ends of the tie wraps are inserted into the respective tie inserts and pulled tight to secure said device to the trailer hitch frame, and e) wherein after said device is secured to the trailer hitch frame, the positive electrical lead is connected to a positive terminal of a vehicle back light and the negative lead is connected to a vehicle body ground.

2. A device for attaching a light to a trailer hitch frame, said device comprising:

a) a lamp assembly having an attached housing that includes an upper surface, a lower surface and a rear surface, wherein attached to the housing is an electrical junction cup from where extends a positive electrical lead and a negative electrical lead, b) a trailer-hitch frame attachment bracket comprising:
   (1) a vertical section having an upper edge, a lower edge, a first side edge and a second side edge, wherein near the lower edge and the first side edge is located a first upset hat and near the lower edge and the second side edge is located a second upset hat,
   (2) a horizontal section that extends outward from the upper edge of said vertical section and terminating with an outer edge, said horizontal section further having a first side edge and a second side edge, wherein near the outer edge and the first side edge is located a third upset hat and near the outer edge and the second side edge is located a fourth upset hat, c) a means for attaching said trailer hitch frame attachment bracket to said lamp assembly housing comprising:
   (1) said lamp assembly further comprising a U-shaped member having a horizontal section and two vertical sections, wherein the horizontal section is rigidly attached to either the upper surface or lower surface of the housing and with the vertical sections each having at least one threaded bore,
   (2) an adjustable lamp attachment assembly comprising:
      (a) a U-shaped member having a horizontal section and two vertical sections, wherein the horizontal section having a substantially centered bore therethrough and the vertical sections each having a longitudinal slot therethrough,
      (b) an angled bracket having a horizontal section and a vertical section, wherein the horizontal section having a first longitudinal slot therethrough and the vertical section having a second longitudinal slot therethrough, wherein the first longitudinal slot is designed to be adjustably attached to the horizontal section of said U-shaped member by means of a bolt and nut combination, wherein the bolt is inserted into the centered bore and the first longitudinal slot, wherein said adjustable lamp attachment assembly allows said lamp assembly to be adjusted radially and in elevation, and is adjustably attached to said lamp attachment assembly by inserting a threaded bolt into each of the longitudinal slots and threaded into the corresponding threaded bores located respectively in the U-shaped member of said adjustable lamp attachment assembly and the U-shaped member of said lamp assembly,
   (3) said trailer hitch attachment bracket further comprises:
      (a) said vertical section having near the upper edge a pair of horizontal, inward facing tabs that are spaced to slidably receive the vertical section of said angled bracket, and with said vertical section further having a substantially centered tab that extends upward from the upper edge and having a threaded bore therethrough,
      (b) said horizontal section further comprised of a first horizontal section and a second horizontal section, wherein:
         (i) the first horizontal section extends outward from the upper edge of said vertical section and terminating with an outer edge, wherein near this outer edge is located a third upset hat that is in alignment with the first upset hat, and
         (ii) the second horizontal section extends outward from a second horizontal section integrally extending outward from the upper edge of said vertical section and terminating with an outer edge, wherein near this outer edge is located a fourth upset hat that is in alignment with the second upset hat, wherein said trailer hitch attachment bracket is adjustably attached to said adjustable lamp attachment assembly in either the first or second positions by inserting the vertical section of said angled bracket into the horizontal inward facing tabs and inserting a threaded bolt into the second longitudinal slot and the threaded bore on the centered tab located respectively on the angled bracket and the trailer hitch frame attachment bracket,
d) means for attaching said trailer hitch attachment bracket to the trailer hitch frame comprising:
 (1) a first tie wrap having a first end and a second end that terminates with a tie insert, wherein the first tie wrap is inserted through the first and third upset hats,
 (2) a second tie wrap having a first end and a second end that terminates with a tie insert, wherein the first end is inserted through the second and fourth upset hats, wherein when said trailer hitch frame attachment bracket is positioned on a trailer hitch frame with the horizontal section positioned on either an upper or lower surface of the trailer hitch frame and with the vertical section pressed against a front surface of the trailer hitch frame, said first and second tie wraps are then wrapped around the trailer hitch frame and the first ends of the tie wraps are inserted into the respective tie inserts and pulled tight to secure said device to the trailer hitch frame, and
e) wherein after said device is secured to the trailer hitch frame, the positive electrical lead is connected to a positive terminal of a vehicle back light and the negative lead is connected to a vehicle body ground.

3. The device as specified in claim 2 wherein the tie insert of said first and second tie wraps is comprised of a releasable tie wrap insert.

4. A device for attaching a light to a trailer hitch frame, said device comprising:
a) a lamp comprising:
 (1) a bulb having attached a housing that includes an upper surface, a lower surface and a rear surface, wherein to the rear surface is attached an electrical junction cup from where extends outward a positive electrical lead and a negative electrical lead,
 (2) a U-shaped member having a horizontal section and two vertical sections, wherein the horizontal section is rigidly attached to either the upper surface or lower surface of the housing and with the vertical sections each having at least one thread bore,
b) an adjustable lamp attachment assembly comprising:
 (1) a U-shaped member having a horizontal section and two vertical sections, wherein the horizontal section having a substantially centered bore therethrough and the vertical sections each having a longitudinal slot therethrough,
 (2) an angled bracket having a horizontal section and a vertical section, wherein the horizontal section having a first longitudinal slot therethrough and the vertical section having a second longitudinal slot therethrough, wherein the first longitudinal slot is designed to be adjustably attached to the horizontal section of said U-shaped member by means of a bolt and nut combination, wherein the bolt is inserted into the centered bore and the first longitudinal slot, wherein said adjustable lamp attachment assembly allows said lamp assembly to be adjusted radially and in elevation, and is adjustably attached to said lamp attachment assembly by inserting a threaded bolt into each of the longitudinal slots and threaded into the corresponding threaded bores located respectively in the U-shaped member of said adjustable lamp attachment assembly and the U-shaped member of said lamp assembly,
c) a trailer hitch frame attachment bracket which can be positioned in either a first position or a second position, wherein when said bracket is in the first position said bracket comprises:
 (1) a vertical sectional having an upper edge, a lower edge, a first side edge and a second wide edge, wherein near the lower edge and the first side edge is located a first upset hat and near the lower edge and the second side edge is located a second upset hat, wherein near the upper edge is located a pair of horizontal, inward facing tabs that are spaced to slidably receive the vertical section of said angled bracket, and with said vertical section further having a substantially centered tab that extends upward from the upper edge and having a threaded bore therethrough,
 (2) a first horizontal section integrally extending outward from the upper edge of said vertical section and terminating with an outer edge, wherein near this outer edge is located a third upset hat that is in alignment with the first upset hat,
 (3) a second horizontal section integrally extending outward from the upper edge of said vertical section and terminating with an outer edge, wherein near this outer edge is located a fourth upset hat that is in alignment with the second upset hat, wherein when said trailer hitch frame attachment bracket is in the second position said bracket comprises:
 (1) a vertical section having an upper edge, a lower edge, a first side edge and a second side edge, wherein near the upper edge and the first side edge is located a first upset hat and near the upper edge and the second side edge is located a second upset hat, wherein near the lower edge is located a pair of horizontal inward facing tabs that are spaced to slidably receive the vertical section of said angled bracket, and with said vertical section further having a substantially centered tab that extends downward from the lower edge and having a threaded bore therethrough,
 (2) a first horizontal section integrally extending outward from the lower edge of said vertical section and terminating with an outer edge, wherein near this outer edge is located a third upset hat that is in alignment with the first upset hat,
 (3) a second horizontal section integrally extending outward from the lower edge of said vertical section and terminating with an outer edge, wherein near this outer edge is located a fourth upset hat, that is in alignment with the second upset hat, wherein said trailer hitch attachment bracket is adjustably attached to said adjustable lamp attachment assembly in either the first or second positions by inserting the vertical section of said angled bracket into the horizontal inward facing tabs and inserting a threaded bolt into the second longitudinal slot and the threaded bore on the centered tab located respectively on the angled bracket and the trailer hitch frame attachment bracket,
d) a trailer hitch attachment means comprising:
 (1) a first tie wrap having a first end and a second end that terminates with a tie insert, wherein the first tie wrap is inserted through the first and third hats,
 (2) a second tie wrap having a first end and a second end that terminates with a tie insert, wherein the first end is inserted through the second and fourth hats, wherein when the first position of said trailer hitch frame attachment bracket is employed, the assembled said device is positioned on a trailer hitch frame with the first and second horizontal sections of said trailer hitch frame attachment bracket resting on an upper surface of the trailer-hitch frame and the vertical section of said trailer hitch frame attachment bracket pressed against a front surface of the trailer hitch frame, said first and second tie wraps are then wrapped around the trailer hitch frame and the first ends of the tie wraps are inserted into the respective first and second tie inserts and pulled tight to secure said device to the trailer hitch frame; wherein when the second position of said trailer hitch frame attachment bracket is employed, the assembled said device is positioned on a trailer hitch frame with the first and second horizontal sections of the trailer hitch frame attachment bracket pressed against a lower surface of the trailer hitch frame and the vertical section of the trailer hitch frame attachment bracket pressed against a front surface of the trailer hitch frame, said first and second tie wraps are then wrapped around the trailer hitch frame and the first ends of the tie wraps are inserted into the respective tie inserts and pulled tight to secure said device to the trailer hitch frame, and e) wherein after said device is secured to the trailer hitch frame, the positive electrical lead is connected to the positive terminal of a vehicle back light and the negative electrical lead is connected to a vehicle body ground.

5. The device as specified in claim 4 wherein said device is dimensioned to be attached to a trailer hitch frame that ranges in size from 1.25 square inches to 4.0 square inches (3.2 to 10.2 cm).

6. The device as specified in claim 5 wherein said light is comprised of 55 watt halogen bulb that produces a wide beam.

7. The device as specified in claim 4 further comprising a weather resistant boot that is placed over the electrical junction cup on said lamp assembly.

8. The device as specified in claim 7 wherein said tie wraps are made of nylon.

9. The device as specified in claim 7 wherein the tie wrap insert of said first and second tie wraps is comprised of a permanent lock tie wrap insert.

10. The device as specified in claim 7 wherein the tie wrap insert of said first and second tie wraps is comprised of a releasable tie wrap insert.

* * * * *